United States Patent
David et al.

(10) Patent No.: US 10,009,325 B1
(45) Date of Patent: Jun. 26, 2018

(54) END-TO-END COMMUNICATION SECURITY

(71) Applicant: Karamba Security, Hod Hasharon (IL)

(72) Inventors: Tal Efraim Ben David, Hogla (IL); Assaf Harel, Ramat Hasharon (IL); Amiram Dotan, Birmingham, MI (US); David Barzilai, Hod Hasharon (IL); Eli Mordechai, Modiin (IL)

(73) Assignee: Karamba Security, Hod Hasharon (IL)

( * ) Notice: Subject to any disclaimer, the term of this patent is extended or adjusted under 35 U.S.C. 154(b) by 0 days. days.

(21) Appl. No.: 15/835,451

(22) Filed: Dec. 7, 2017

(51) Int. Cl.
| | |
|---|---|
| H04L 29/06 | (2006.01) |
| H04L 9/16 | (2006.01) |
| H04L 9/08 | (2006.01) |
| H04L 9/32 | (2006.01) |
| H04L 12/40 | (2006.01) |

(52) U.S. Cl.
CPC ............ *H04L 63/0464* (2013.01); *H04L 9/08* (2013.01); *H04L 9/0866* (2013.01); *H04L 9/0869* (2013.01); *H04L 9/16* (2013.01); *H04L 9/3278* (2013.01); *H04L 63/0442* (2013.01); *H04L 63/166* (2013.01); *H04L 2012/40215* (2013.01); *H04L 2209/84* (2013.01)

(58) Field of Classification Search
CPC ....... H04L 2209/84; H04L 2012/40215; H04L 9/08; H04L 9/3278
See application file for complete search history.

(56) References Cited

U.S. PATENT DOCUMENTS

| | | | | |
|---|---|---|---|---|
| 9,792,440 | B1* | 10/2017 | Wang | G06F 21/575 |
| 2005/0105738 | A1* | 5/2005 | Hashimoto | G06F 21/72 |
| | | | | 380/277 |
| 2010/0098095 | A1* | 4/2010 | Kato | H04L 12/4625 |
| | | | | 370/401 |
| 2013/0051552 | A1* | 2/2013 | Handschuh | G06F 21/602 |
| | | | | 380/44 |
| 2013/0301834 | A1* | 11/2013 | Kawamura | H04W 12/04 |
| | | | | 380/270 |
| 2014/0258736 | A1* | 9/2014 | Merchan | G06F 21/62 |
| | | | | 713/193 |
| 2014/0309905 | A1* | 10/2014 | Drew | F02D 29/02 |
| | | | | 701/101 |
| 2015/0033016 | A1* | 1/2015 | Thornton | H04L 9/0825 |
| | | | | 713/171 |
| 2015/0100197 | A1* | 4/2015 | Peirce | H04W 12/08 |
| | | | | 701/31.5 |

(Continued)

OTHER PUBLICATIONS

PUF-based Security Enhancement for Automotive Software Update; Hiroyuki Tomiyama; Ritsumeikan University; MPSoC 2015 (Year: 2015).*

(Continued)

*Primary Examiner* — James R Turchen
(74) *Attorney, Agent, or Firm* — Fish & Richardson P.C.

(57) ABSTRACT

In one implementation, a method for providing end-to-end communication security for a controller area network (CAN-bus) in an automotive vehicle across which a plurality of electronic control units (ECU) communicate is described. Such an automotive vehicle can include, for example, a car or truck with multiple different ECUs that are each configured to control various aspects of the vehicle's operation, such as an infotainment system, a navigation system, various engine control systems, and/or others.

20 Claims, 8 Drawing Sheets

(56) References Cited

U.S. PATENT DOCUMENTS

| | | | | |
|---|---|---|---|---|
| 2015/0113520 | A1* | 4/2015 | Kotani | G06F 8/65 717/172 |
| 2016/0173505 | A1* | 6/2016 | Ichihara | H04L 63/123 713/170 |
| 2016/0305246 | A1* | 10/2016 | Welch | G06Q 10/06 |
| 2016/0315766 | A1* | 10/2016 | Ujiie | H04L 9/08 |
| 2016/0342531 | A1* | 11/2016 | Sharma | G06F 12/1408 |
| 2017/0041290 | A1* | 2/2017 | Ning | H04L 63/0209 |
| 2017/0134164 | A1* | 5/2017 | Haga | H04L 9/085 |
| 2017/0139795 | A1* | 5/2017 | Komano | G06F 21/00 |
| 2017/0286675 | A1* | 10/2017 | Shin | G06F 21/558 |
| 2017/0324579 | A1* | 11/2017 | Takada | H04L 12/40163 |
| 2018/0006829 | A1* | 1/2018 | Kravitz | H04L 63/10 |

OTHER PUBLICATIONS

Ueda, H., Kurachi, R., Takada, H., Mizutani, T., Inoue, M. and Horihata, S., 2015. Security Authentication System for In-Vehicle Network. SEI Technical Review, (81). (Year: 2015).*

Siddiqui, A.S., Plusquellic, Y.G.J. and Saqib, F., 2017. Secure communication over CANBus [C]. In IEEE, International Midwest Symposium on Circuits and Systems. IEEE (pp. 1264-1267). (Year: 2017).*

Siddiqui, A.S., Gui, Y., Plusquellic, J. and Saqib, F., A Secure Communication Framework for ECUs. 2017 (Year: 2017).*

Hazem, A. and Fahmy, H.A., Nov. 2012, Lcap-a lightweight can authentication protocol for securing in-vehicle networks. In 10th escar Embedded Security in Cars Conference, Berlin, Germany (vol. 6). (Year: 2012).*

Avatefipour, O., 2017. Physical-Fingerprinting of Electronic Control Unit (ECU) Based on Machine Learning Algorithm for In-Vehicle Network Communication Protocol "CAN-BUS". (Year: 2017).*

'automotive-security.net' [online]. "How It Works," 2018, [retrieved on Feb. 27, 2018]. Retrived from the Internet: URL http://www.automotive-security.net/vatican/internals/ . 3 pages.

'media.nxp.com' [online]. "New NXP CAN Transceiver Family Secures CAN Communications Without Cryptography," Jan. 31, 2018, [retrieved on Feb. 27, 2018]. Retrieved from the Internet: URL http://media.nxp.com/phoenix.zhtml?c=254228&p=irol-newsArticle&ID=2329212. 4 pages.

CANcrypt, "Cancrypt Technology Basics," 2017, 10 pages.

Happel, "Secure communication for CAN FD," CAN Newsletter, 2014, 3 pages.

Nurnberger and Rossow, "—vatiCAN—Vetted, Authenticated CAN Bus," CISPA, Saarland University, Germany, 2016, 20 pages.

Pfeiffer, "Implementing Scalable CAN Security with CANcrypt: Authentication and encryption for the Controller Area Network and CANopen," Embedded Systems Academy, 2017, 40 pages.

* cited by examiner

US 10,009,325 B1

END-TO-END COMMUNICATION SECURITY

TECHNICAL FIELD

This specification generally relates to security for computer-based controllers, such as controllers for Internet of Things (IoT) devices.

BACKGROUND

More devices are becoming "smarter" with hardware and software that permit them to communicate via the internet, such as through cellular wireless networks, Wi-Fi, and Bluetooth. These internet-connected devices are often identified as being part of the "Internet of Things" (IoT), which is a term that broadly encompasses internet-connected devices configured to transmit and receive information related to their operation, such as status information. For example, many consumer products are now IoT devices with internet-connected features, such as home automation devices (e.g., wirelessly controllable light switches), appliances (e.g., smart refrigerators able to transmit images of the fridge's contents), and automobiles (e.g., internet-connected components, such as infotainment and navigation devices). For instance, modern vehicles can have over 100 controllers, or Electronic Control Units (ECUs), that are responsible for running most of the car's functions, such as the steering wheel, engine, braking system, airbags, and navigation systems. When IoT devices include multiple controllers, in some instances the controllers communicate over an internal network within the IoT device (e.g., CANBus).

Like any other externally connected computers, IoT devices (e.g., ECUs in connected cars) are vulnerable to cyber-attacks and have become targets for hackers. For example, controllers on several makes and models of cars, such as the JEEP CHEROKEE, TOYOTA PRIUS, TESLA MODEL S, and NISSAN LEAF, have been successfully targeted and exploited by white hat hackers. Those hackers were able to compromise the vehicles and take command of nearly all of the control aspects, ranging from turning on the radio and windshield wipers to killing the engine while the car drove on the freeway. These exploits caused some of these car manufacturers to issue a recall on affected vehicles.

Cyber-attacks come in many forms and flavors, but they generally share the same basic concepts: find a preexisting security bug (vulnerability) in a system or a network, exploit it, and perform malicious actions (e.g., running malware, eavesdropping on communications, spoofing the identity of others). For example, network packets that are broadcast to network participants without any sort of encryption (or other mechanism to hide/obfuscate the message contents) are susceptible to eavesdropping by other entities on the network. In another example, network communication that uses a common transmission medium (e.g., a bus) to broadcast messages among network participants can be susceptible to network participants spoofing the identity of others on the network (e.g., transmitting messages with the sender field having been modified so that the messages appear to originate from another device on the network).

SUMMARY

This document generally describes a technological solution that provides end-to-end communication security for controllers (e.g., ECUs) communicating with each other over a common communication network (e.g., CANBus, LINBus, FlexRay channels, Ethernet), such as multiple controllers communicating with each other over a bus within an IoT device (e.g., connected automobile). End-to-end communication security can help secure communication over a common communication network so that senders and recipients are able to verify the authenticity of the other end of the communication, and to obfuscate the contents of the communication (e.g., encrypt) so that they are only viewable to the sender and receiver (and not to any other controllers/devices on the communication network). End-to-end communication security can be provided in a variety of ways, such as by having every controller that transmits and receives a broadcast message on a network (e.g., CANBus) generate a symmetric key that can then be used to verify and authenticate encrypted communication between only the those controllers, while also obfuscating the communication from the other controllers on the communication network. Symmetric keys can be generated and verified within the controller pairs by using controller-specific features that are not able to be cloned or spoofed, such as by using physically unclonable functions (PUF) of the controller, such as SRAM characteristics, processor crystal characteristics, and/or others. Symmetric keys can be stored and encrypted locally on the controllers, and can be stored on a secure remote system that is able to remotely challenge and verify controller authenticity (e.g., remote attestation).

End-to-end communication security can resolve a variety of security risks associated with controllers and other devices communicating over a common communication network. For example, without end-to-end communication security, communicating over a common communication network can expose all network communications to the controllers and other devices on the network can pose a variety of security risks, such as spoofing and eavesdropping. For instance, a controller that has been corrupted with malware can spoof the identity of other controllers by spoofing the CAN message ID (or other message identifier) in packet headers. In another example, a controller corrupted with malware can eavesdrop on communication between other controllers, which may permit the malware to obtain confidential/secret information (e.g., passwords, authorization codes, account information). In another example, a malicious controller (e.g., malicious ECU that already contains malicious code) that is physically added to a device/system (e.g., vehicle) through one of the device/system's ports (e.g., through the OBD-2 port, physically connecting to the CANBus) can perform spoofing and/or eavesdropping on the network (e.g., CANBus). End-to-end communication security can resolve each of these issues by ensuring that controllers are able to verify the identity of the sender/recipient through previously established symmetric keys that are unique to each controller pair, and by ensuring that communication between controller pairs is obfuscated from all other controllers.

In one implementation, a method for providing end-to-end communication security on controllers includes determining, by a controller, a fingerprint for the controller; generating, by the controller, a plurality of cryptographic keys using the fingerprint as a seed value, the plurality of cryptographic keys including, at least, a public key and a corresponding private key for the controller and a communications table key for the controller; and performing a remote attestation process with a remote computer system to validate the controller; in response to passing the remote attestation process, exchanging public cryptographic keys with each of a plurality of other controllers, each exchange having a corresponding identifier, wherein the controller is programmed to generate a plurality of symmetric keys for communication with the plurality of other controllers using the private key for the controller and the public keys received from the other controllers; creating, by the controller, a communication table that includes entries for the plurality of other controllers, the entries in the communication table including the corresponding identifiers and the public keys received from the other controllers; encrypting, by the controller, the communication table using the communications table key; and storing, by the controller, the encrypted communication table locally on the controller.

Certain implementations can include one or more of the following features. The method can further include receiving, at the controller, an indication that the controller is currently operating within a safe environment. The remote attestation, the public cryptograph key exchange, and the communication table creation, encryption, and storage can be performed in response to receiving the indication that the controller is operating within a safe environment. The method can further include deleting, by the controller, the plurality of cryptographic keys and the fingerprint after storing the encrypted communication table. The method can further include during runtime and after deleting the plurality of cryptographic keys and the fingerprint, performing one or more of the following: determining, independent of the first fingerprint determination, the fingerprint for the controller; generating, independent of the first generation of the plurality of cryptographic keys, the plurality of cryptographic keys using the fingerprint as the seed value; decrypting the encrypted communication table using the communications table key from the plurality of cryptographic keys; generating the plurality of symmetric keys for each of the entries in the communication table using the private key for the controller and the public keys stored in the communication table; creating a plurality of symmetric key streams for communicating with each of the plurality of other controllers using the plurality of symmetric keys; and securely communicating with each of the plurality of other controllers with symmetric encryption using the plurality of symmetric key streams. The plurality of cryptographic keys can further include an authentication key. The encrypted communication table can be signed using the authentication key. Decrypting the encrypted communication table can include authenticating the communication table using the authentication key. The encrypted communication table can be signed using a hash-based message authentication code (HMAC) generated with the authentication key and the encrypted communication table. The plurality of symmetric keys can be generated using Diffie-Helman. The method can further include deleting, by the controller, the plurality of cryptographic keys and the fingerprint after generating the plurality of symmetric keys.

The fingerprint can be determined from one or more physically unclonable functions (PUFs) on the controller. At least one of the one or more PUFs can be determined based on RAM or SRAM characteristics of the controller. At least one of the one or more PUFs is determined based processor crystal characteristics of the controller. The method can further include detecting, by the controller, one or more communication-related errors on the controller; and transmitting, by the controller, an alert to the remote computer system. The one or more communication-related errors can include the communication table being unsuccessfully decrypted or authenticated. The one or more communication-related errors can include at least one of the other controllers being unable to successfully respond to a challenge transmitted using a corresponding symmetric key for the at least one of the other controllers. The one or more communication-related errors can include an encrypted message from at least one of the other controllers being unsuccessfully decrypted using a corresponding symmetric key for the at least one of the other controllers. The method can further include, in response detecting the one or more communication-related errors, dropping the message. Unsuccessful decryption of an encrypted message can include one or more of: a message structure being incorrect, a message field being incorrect, and a data structure in the message being incorrect. The remote attestation process can include receiving a challenge request with regard to one or more segments of the controller's firmware; generating hash values of the one or more segments; and transmitting the hash values to the remote computer system. The entries in the communication table can include only the corresponding identifiers and the public keys received from the other controllers, and do not include the symmetric keys. The controller and the plurality of other controllers can communicate with each other over a common bus. The common bus can include a CANBus, and the controller and plurality of other controllers comprise electronic control units (ECUs) that are physically included in a vehicle. The method can further include determining, by the controller, that the controller is currently operating within a safe environment. The remote attestation, the public cryptograph key exchange, and the communication table creation, encryption, and storage can be performed in response to receiving the indication that the controller is operating within a safe environment. The determination that the controller is currently operating within a safe environment can be based on the controller being booted-up for the first time.

In another implementation, a method for providing end-to-end communication security for a controller area network (CANbus) in an automotive vehicle across which a plurality of electronic control units (ECU) communicate includes determining, by a first ECU in the automotive vehicle, a fingerprint for the first ECU; generating, by the first ECU, a plurality of cryptographic keys using the fingerprint as a seed value, the plurality of cryptographic keys including, at least, a public key and a corresponding private key for the first ECU and a communications table key for the first ECU; performing a remote attestation process with a remote computer system to validate the first ECU; in response to passing the remote attestation process, exchanging public cryptographic keys with other ECUs from among the plurality of ECUs in the automotive vehicle, wherein the CANbus in the automotive vehicle has a plurality of CANbus messages with corresponding CANbus message identifiers, wherein the first ECU exchanges public cryptographic keys with the other ECUs for each of the CANbus message identifiers for which the first ECU is programmed to either transmit or listen for corresponding CANbus messages on the CANbus, wherein the first ECU is programmed to generate a plurality of symmetric keys to use for communicating using the CANbus message identifiers for communication with the other ECUs using the private key for the first ECU and the public keys received from the other ECUs; creating, by the first ECU, a communication table that includes entries for the plurality of CANbus messages, the entries in the communication table including the corresponding CANbus message identifiers and the public keys received from the other ECUs; encrypting, by the first ECU, the communication table using the communications table key; and storing, by the first ECU, the encrypted communication table locally on the first ECU.

Certain implementations can optionally include one or more of the following features. The method can further include receiving, at the first ECU, an indication that the first ECU is currently operating within a safe environment. The remote attestation, the public cryptograph key exchange, and the communication table creation, encryption, and storage can be performed in response to receiving the indication that the first ECU is operating within a safe environment. The method can further include deleting, by the first ECU, the plurality of cryptographic keys and the fingerprint after storing the encrypted communication table. The method can further include, during runtime and after deleting the plurality of cryptographic keys and the fingerprint, performing one or more of the following: determining, independent of the first fingerprint determination, the fingerprint for the first ECU; generating, independent of the first generation of the plurality of cryptographic keys, the plurality of cryptographic keys using the fingerprint as the seed value; decrypting the encrypted communication table using the communications table key from the plurality of cryptographic keys; generating the plurality of symmetric keys for each of the entries in the communication table using the private key for the first ECU and the public keys stored in the communication table; creating a plurality of symmetric key streams for communicating with each of the plurality of other ECUs using the plurality of symmetric keys; and securely transmitting and listening for encrypted CANbus messages over the CANbus with symmetric encryption using the plurality of symmetric key streams. The plurality of cryptographic keys can further include an authentication key. The encrypted communication table can be signed using the authentication key. Decrypting the encrypted communication table can include authenticating the communication table using the authentication key. The encrypted communication table can be signed using a hash-based message authentication code (HMAC) generated with the authentication key and the encrypted communication table. The plurality of symmetric keys can be generated using Diffie-Helman.

The method can further include deleting, by the first ECU, the plurality of cryptographic keys and the fingerprint after generating the plurality of symmetric keys. The fingerprint can be determined from one or more physically unclonable functions (PUFs) on the first ECU, wherein values for the one or more PUFs for the first ECU are independent of and different from values for PUFs on the other ECUs in the automotive vehicle. At least one of the one or more PUFs can be determined based on RAM or SRAM characteristics of the first ECU. At least one of the one or more PUFs can be determined based processor crystal characteristics of the first ECU. The method can further include detecting, by the first ECU, one or more communication-related errors on the first ECU; and transmitting, by the first ECU, an alert to the remote computer system. The one or more communication-related errors can include the communication table being unsuccessfully decrypted or authenticated by the first ECU. The one or more communication-related errors can include an encrypted CANbus message from at least one of the other ECUs being unsuccessfully decrypted using a corresponding symmetric key for the corresponding CANbus message identifier. The method can further include, in response detecting the one or more communication-related errors, dropping the message by the first ECU. Unsuccessful decryption of an encrypted message can include one or more of: a message structure being incorrect, a message field being incorrect, and a data structure in the message being incorrect. The entries in the communication table can include message formats for the plurality of CANbus messages, wherein the message formats are used to determine whether the message structure is incorrect, the message field is incorrect, and the data structure of the message is incorrect. The remote attestation process can include receiving, at the first ECU, a challenge request with regard to one or more segments of the first ECU's firmware; generating, by the first ECU, hash values of the one or more segments; and transmitting, by the first ECU, the hash values to the remote computer system. The entries in the communication table can include the corresponding CANbus message identifiers and the public keys received from the other ECUs, and do not include the symmetric keys. The method can further include determining, by the first ECU, that the first ECU is currently operating within a safe environment. The remote attestation, the public cryptograph key exchange, and the communication table creation, encryption, and storage can be performed in response to receiving the indication that the first ECU is operating within a safe environment. The determination that the first ECU is currently operating within a safe environment can be based on the first ECU being booted-up for the first time.

Certain implementations can provide one or more of the following advantages. For example, end-to-end communication security can permit senders and recipients communicating over an open communication network (e.g., CANBus) to verify the identity of the sender and recipient, which can thwart spoofing attempts. In another example, end-to-end communication security can permit communication between controller pairs to be encrypted and obfuscated from view of other controllers on the communication network, which can thwart eavesdropping. In another example, restricting key creation and key exchange to a secure and verified environments and encrypted storage of key pairs can permit for reliable use of those key pairs during run time in potentially unsecure environments, and can ensure that the key pairs are reliable and tamper-proof. In another example, not only can controllers verify the identity and authenticity of other controllers on the communication network, but a remote system can additionally verify the authenticity of controllers, which can provide an additional layer of security and verification to ensure secure operation of the controllers and the communication network. In another example, unclonable features of controllers, such as PUFs, can be used to generate and verify key values, which can prohibit instances of malicious controllers having obtained and attempting to use symmetric key values.

In another example, end-to-end communication security can be implemented with no changes to the communication protocol (e.g., protocol message format), with negligible performance impacts, in a way that is seamless to the application layer (e.g., no modifications to application layer protocols), with no added traffic during runtime (e.g., no added fields nor packet contents, nor extra packets), and/or in ways that permit mixed controllers (e.g., mixed ECUs) and/or hardware platforms (e.g., chipset agnostics) to operate together. Not only can security be improved, but it can be improved in ways that have minimal (if any) impacts on controller performance, application design, and/or system performance—meaning that end-to-end communication security can readily be implemented on any controllers and any communication network to improve communication security.

In another example, end-to-end communication security can permit a remote system (e.g., cloud based computer system) to securely provide remote updates and other communication to controllers (e.g., "over the air" updates) in ways that can thwart potential eavesdropping, spoofing, and/or other attacks. For instance, controllers can add an entry to their communications table for such a remote system when they are creating entries for other controllers that are part of a network. Likewise, a remote system can create a communications table that has entries for the controllers. Using these entries in the communications tables, the controllers and the remote systems can securely generate symmetric keys (e.g., generate keys without any information being exchanged) and can use those keys to ensure private and secure communication between each controller and the remote system. Such secure communication can include, for example, over the air updates for controllers.

In another example, end-to-end communication security can minimize traffic overhead since communication buses can be already overloaded. End-to-end communication security can also provide encryption on a controller network with minimal impact on controller performance (e.g., CPU power and memory consumption), which has the potential to be otherwise significant since cryptography can be considered as a heavy computation task requiring significant CPU power and memory consumption, which can be a drain on controller resources (which may already be limited). End-to-end communication can also account for and prevent attack vectors where a malicious controller is connected to the system, impersonating as a legitimate controller by using its arbitration/message ID's to inject malicious messages into the bus, and interfere with the normal system behavior.

Additional and/or alternative advantages are also possible, as described below.

BRIEF DESCRIPTION OF THE ATTACHMENTS

Like reference numbers and designations in the various drawings indicate like elements.

DETAILED DESCRIPTION

Figure 1A:
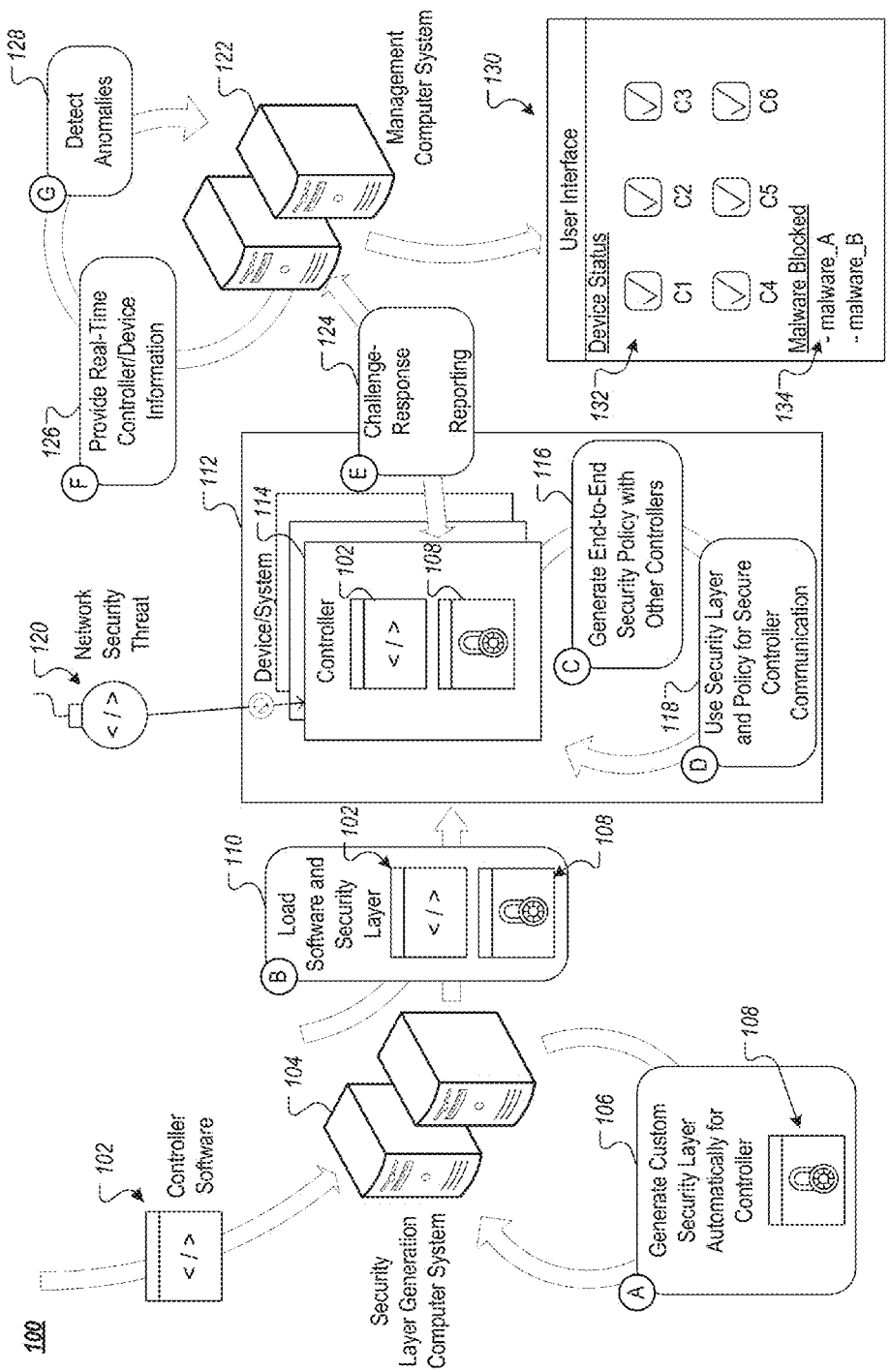
FIG. 1A is a conceptual diagram of an example system 100 for providing end-to-end communication security on a network connecting example controllers.

FIG. 1A is a conceptual diagram of an example system 100 for generating and implementing a custom security layer that will provide end-to-end communication security on example controllers. The example system 100 includes a security layer generation computer system 104 (e.g., computer server system, cloud computing system, client computing device) that is programmed to generate a custom security layer for controllers 114 that are part of an example device/system 112 (e.g., automobile, IoT device). The controllers 114 can use the generated security layer to operate securely and to prevent malware attacks (e.g., spoofing, eavesdropping). The system 100 can also include a management computer system 122 (e.g., computer server system, cloud computing system, client computing device) that is programmed to remotely challenge and validate the controllers 114, and to receive real-time controller information, which can additionally be used to detect anomalous controller behavior and to provide an interface for users to view real-time controller/device status information. Although not depicted, the system 104, the device/system 112, and the system 122 can communicate over one or more communication networks, such as the internet, local area networks (LAN), wide area networks (WAN), virtual private networks (VPN), controller area networks (CAN), wired networks, wireless networks, mobile data networks, or any combination thereof.

The security layer generation computer system 104 can receive controller software 102, which can include an operating system and/or applications that are to be run on a controller. The security layer generation computer system 104 can use the controller software to automatically generate a custom context-based security layer 108 for each of the controllers 114, as indicated by step A (106), which can be used by each of the controllers 114 to generate a local security policy (e.g., secure communications table) that will permit secure and a controller-agnostic end-to-end communication security among the controllers. For example, the computer system 104 can analyze the software 102 (e.g., static analysis, dynamic analysis) to generate a custom security layer 108 that will permit each of the controllers 114 to establish end-to-end communication security for communication between the controllers 114 within the device/system 112. For instance, custom security layers 108 can be generated across different controllers 114 with different hardware and software without the underlying software 102 needing to be changed. Furthermore, the custom security layers 108 can be generated in a way that is hardware and software agnostic—permitting end-to-end communication security to be established across different controllers with different hardware and software platforms. The custom security layer 108 can be programmed to, for example, automatically create a custom end-to-end security policy (e.g., communications table) for the controllers 114 during an initial boot key exchange session (e.g., first boot of the controllers 114).

The security layer generation can be performed by the computer system 104 in a way that does not necessitate any sort of modification to the controller software 102. For example, the custom security layer 108 can be separate from and not rely on modification of the software 102 in order to operate. By generating and implementing the security layer 108 without having to modify or alter the controller software 102, the system 100 can additionally reduce the burden on security layer implementation, which can increase security layer implementation and overall controller security. For example, if the controller software 102 were to be modified in significant ways in order to incorporate the security layer 108, the software 102 would need to be verified and tested again after the security layer 108 has been integrated into the system, which can slow time to deployment and can delay the incorporation of security layers on controllers.

The computer system 104 (and/or other computer systems, such as original equipment manufacturers (OEM)) can load the software 102 and the security layer 108 for the controller 114 of the Device/system 112, as indicated by step B (110). For example, the controller software 102 and the security layer 108 can be flashed onto the controller 114.

The controller 114 can use the security layer 108 to generate an end-to-end security policy for communication with the other controllers 114 and, in some instances, other devices and/or systems (e.g., management computer system 112), as indicated by step C (116). For example, the security layer 108 can include encryption schemes, rules, and agents for performing key exchanges among the controllers 114 (and other authorized devices/systems) to create end-to-end communication policies that can be used to securely communicate among the controllers 114 (and other authorized devices/systems). For instance, each of the controllers 114 can use the security layers 108 to exchange keys (that can be used to create shared secrets) for controller pairs to communicate with each other, and then to use those keys for communication during runtime of the device/system 112. By having each controller-pair in the device/system 112 have an encryption key that is specific to communication between those two controllers (making up a controller-pair), other controller in the device/system 112 are not able to eavesdrop on or monitor their communication, and also are not able to spoof the identity of other controllers. This can help provide secure communication among the controllers 114 (and other authorized devices/systems), as indicated by step D (118), which can help thwart network security threats 120, such as spoofing and eavesdropping. For example, a first controller that has been corrupted by malware may attempt to spoof the identity of other controllers and/or eavesdrop on the communication of other controllers in order to direct the operation of other controllers and/or to onboard malware for other controllers. By establishing end-to-end communication security across each of the controllers 114, corruption of one of the controllers through malware can be isolated and contained from the other controllers.

The controllers 114 can log information about its operation, including blocked spoofing attempts from other controllers 114 on the device/system 112. For example, a controller attempting to spoof the identity of another controller will become readily apparent to the recipient of the spoofing attempt because it will not use the correct encryption key between the controller pairs. Such instances of spoofing can indicate that one or more controllers 114 on the device/system 112 have been corrupted, which can be logged and reported out to the management computer system, as indicated by step E (124). Such reporting can be provided in real-time. For example, the controller 114 can report malware attempts in response to the malware 120 attempt being blocked (e.g., spoofing attempt being blocked). The controller 114 can balance reporting with controller performance against the timeliness of reporting for less critical information, such as information about secure operation of the controller 114 during periods of time when no malware attacks were attempted/blocked. For instance, such reports can be delayed until periods of time when the controller 114 and/or the device 112 have at least a sufficient amount of processing capacity and/or network bandwidth available.

Also indicated by step E (124) are challenge and responses between the management computer system 122 and the controllers 114. The management computer system 122 can store encryption keys and other identifying information for the controllers 114 (e.g., flash of firmware on the controllers), which the management computer system 122 can use to verify the authenticity of the controllers 114.

The management computer system 122 can receive reports from the controller 114 as well as from multiple other controllers and devices, and can aggregate the reports into a central database system. The reports can be used to provide real-time controller/device information, as indicated by step F (126). For example, the computer system 122 can transmit real-time information that is presented on client computing devices (e.g., mobile computing devices, laptops, desktop computers) in user interfaces, such as the example user interface 130 that includes status information 132 for example controllers C1-C6 and malware information 134 that identifies particular malware that has been blocked by these controllers, as well as other information (e.g., device/controller context when the malware was blocked). The real-time information can be at any of various levels of granularity, such as a device-level (status information for a specific device) and/or a population-level (status information across multiple devices/systems).

The computer system 122 can additionally use the information reported by controllers to detect anomalies, as indicated by step G (128). For example, the computer system 122 can use statistical analysis to identify operation/behaviors that are outside of the normal operation of a controller, such as identifying a particular context for a particular process that is a statistical outlier outside of the normal operation of a controller.

Figure 1B:
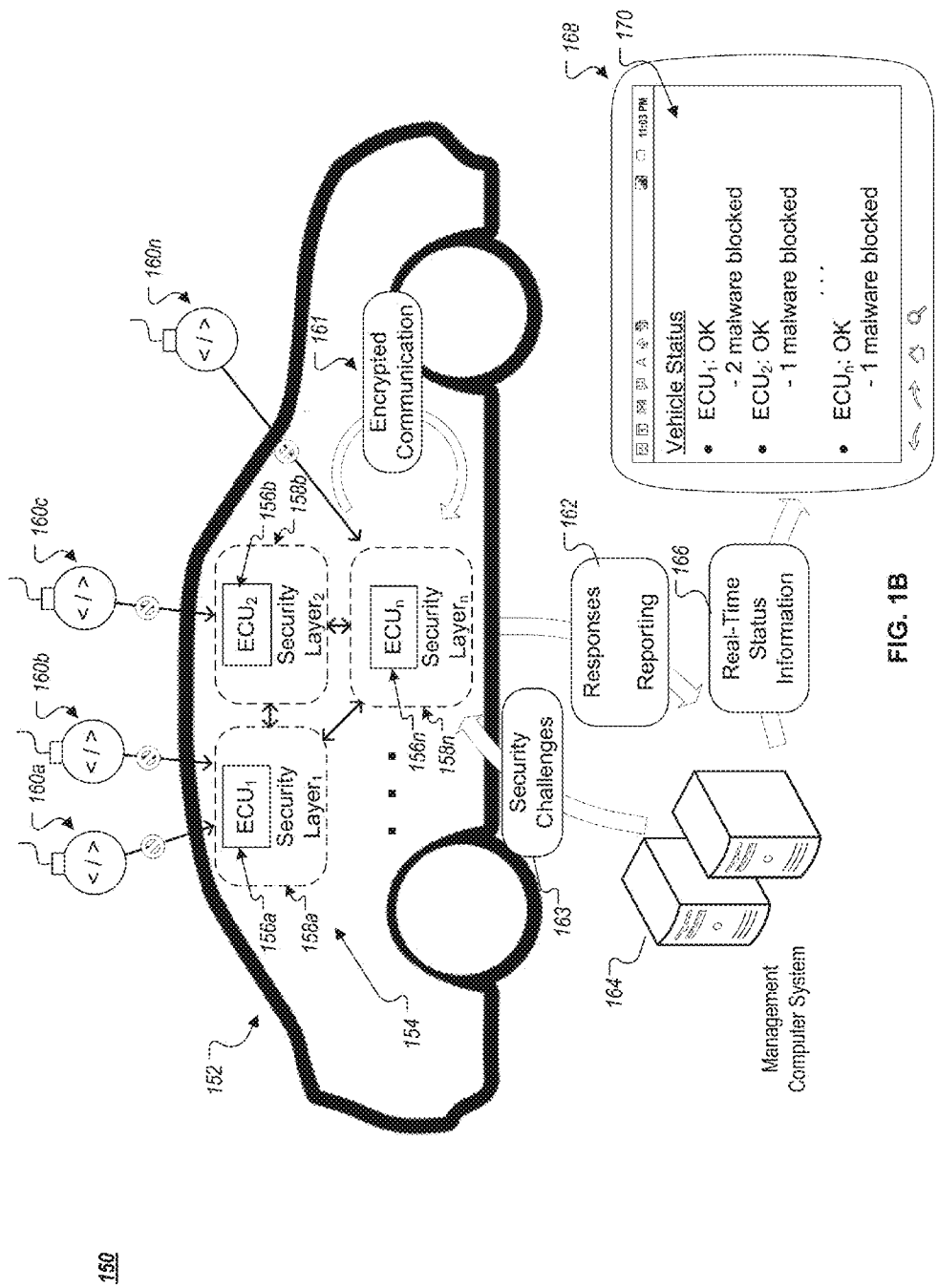
FIG. 1B is a conceptual diagram of an example system for generating and implementing custom end-to-end communication security layers on example ECUs that are part of an example vehicle.

FIG. 1B is a conceptual diagram of an example system 150 for generating and implementing custom end-to-end communication security layers on example ECUs that are part of an example vehicle 152. The example system 150 is an example implementation of the system 100 to a specific IoT context, which in this example is the vehicle 152. The system 100 and the system 150 can be implemented on a variety of other IoT devices and systems.

In this example, the vehicle 152 includes a control system 154 that includes multiple ECUs 156a-n that each have their own custom end-to-end communication security layer 158a-n, that they can use to generate end-to-end security policies to securely communicate with each other (and other authorized systems, such as the remote management system 164). Although not depicted, the security layers 158a-n can be generated in a similar manner described above with regard to FIG. 1A and the security layer generation computer system 104. The security layers 158a-n can be used to establish secure end-to-end communication among the ECUs 156a-n and can effectively block network security threats 160a-n (e.g., spoofing, eavesdropping), which can be attempts by hackers to find a way into the CANBus of the vehicle 152 and to exploit those vulnerabilities to attack other ECUs 156a-n. While the vehicle 152 can include over a hundred ECUs connected to the CANBus, only a few may be open externally (accessible to external networks outside of the vehicle 152, such as the internet). These external ECUs (e.g., ECUs 156a-n) can be the gateways into the car and the security layers 158a-n can stop network attackers at these gateways, which can significantly reduce, if not eliminate, the risk of attacks penetrating the car's network, which can disrupt the car's operation.

For example, the end-to-end communication security layers 158a-n can be used to establish secure and verified communication among each of the ECUs 156a-n. By doing so, malicious code may be prevented from infiltrating communication among the ECUs 156a-n while having minimal performance impact on the ECUs 156a-n. By using the security layers 158a-n that are specific to the ECUs 156a-n, any communication outside of communication with known-valid and authentic ECUs can be immediately detected and stopped from running on the ECUs 156a-n. This can allow the ECUs 156a-n to stop malicious code from ever being executed by and possibly taking control of an ECUs' operation.

For instance, hackers targeting the vehicle 152 can use a "dropper," which is a small piece of code or operation, to try to exploit a vulnerability and implant the malware 160a-n. The malware 160a-n is the code that ultimately tampers with or takes control of the function of the vehicle 152, which can cause significant damage and put the safety of the driver and others on the road at risk. By adding end-to-end communication security layers 158a-n to ECUs 156a-n, the ECUs 156a-n are able to detect communication from a dropper that is unsigned (e.g., not properly encrypted) and/or that is trying to spoof the identity of another ECU, and can ignore the communication (e.g., not process the communication, drop the network packets). Additionally, when such malicious network behavior is detected, an ECU can immediately transmit a report on the attack attempt in real-time, as indicated by step 162. The early warning can give the original equipment manufacturers (OEMs) and system providers of the vehicle 152 (and its subparts) time to address the threat, as indicated by the computer system 164 providing real-time status information to a client computing device 168 with information 170 on malware that has been blocked across the ECUs 156a-n (step 166). For example, an alert on the malware 160a-n can include the complete trail of the attack on the ECUs 156a-n, including its source, path, and context of the vehicle 152 and/or ECUs 156a-n when the attack was blocked, so vulnerabilities can be fixed and blocked to prevent any malware from infiltrating the CANBus on the vehicle 152.

Dropper and other hacker attempts to introduce the malware 160a-n on the externally connected ECUs 156a-n can be detected by the end-to-end communication security layers 158a-n as foreign code based on attempts to infiltrate the CANBus.

The management computer system 164 can additionally issue security challenges (163) to the ECUs 156a-n, which the ECUs 156a-n can process and respond to (162). These responses can additionally be used to generate the information 170 on the status of the ECUs 156a-n.

End-to-end communication security layers (e.g., security layer 108, security layer 158a-n) can be implemented on newly deployed controllers and can be retrofitted on previously released controllers that may not have previously included security layers. Such retrofitting can improve the security of devices already in use and can be added as part of regular software updates that drivers receive during regular maintenance and updating. Retrofitting can involve, for example, ensuring that the vehicle 152 is at a secure and verified facility (e.g., manufacturer, dealership, authorized service station) and, once verified, permitting the ECUs 156a-n to exchange keys with each other to generate their end-to-end security policies (e.g., communications tables). Once retrofitted, previously deployed controllers can be protected with network security that will thwart network security threats, such as spoofing attempts and eavesdropping.

Figure 1C:
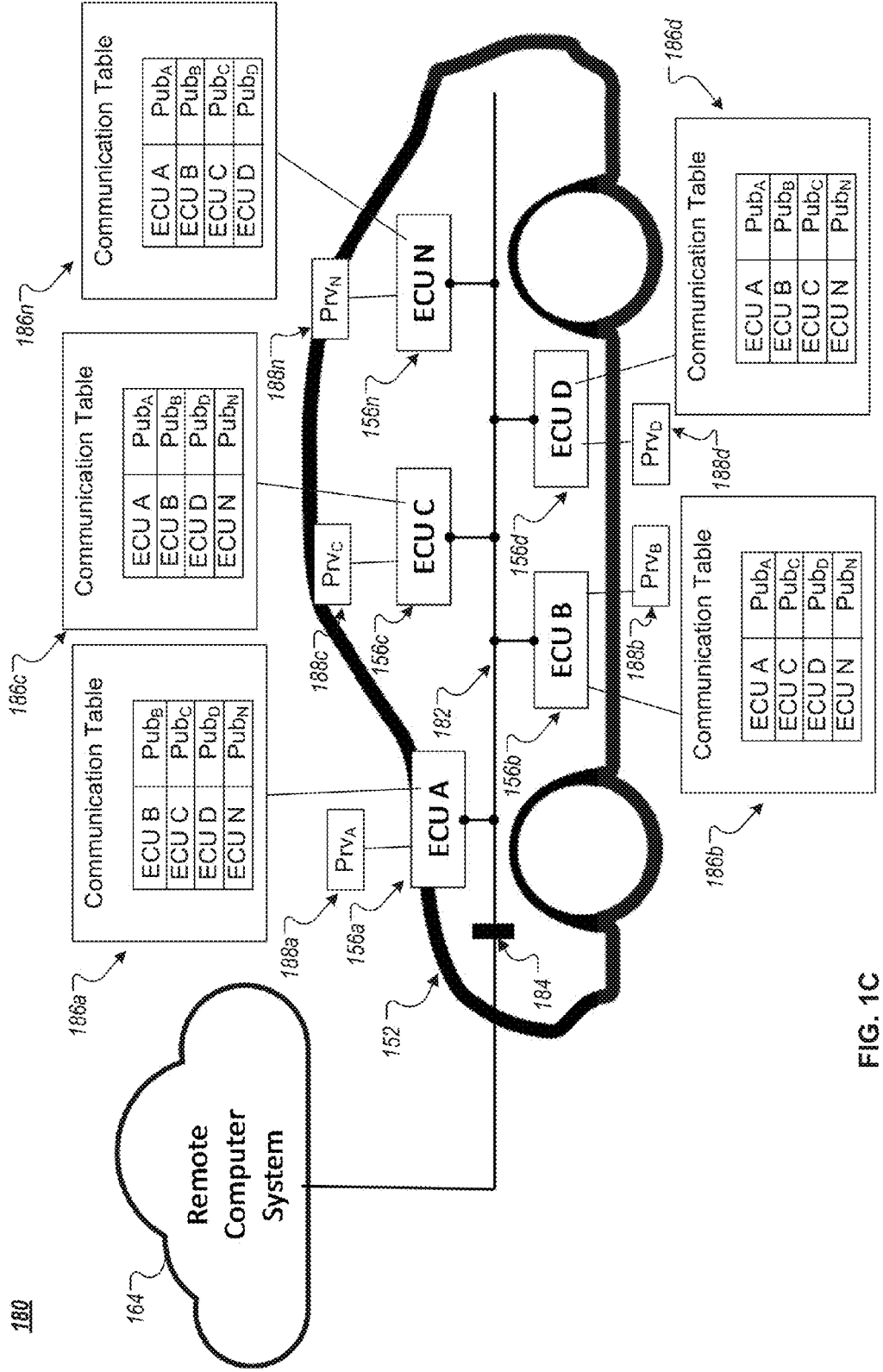
FIG. 1C is a conceptual diagram of an example system for using custom end-to-end communication security layers on example ECUs that are part of an example vehicle.

FIG. 1C is a conceptual diagram of an example system 180 for using custom end-to-end communication security layers on example ECUs 156a-n that are part of an example vehicle 152. The example system 180 is an example implementation of the systems 100 and 150 to a specific IoT context, which in this example is the vehicle 152. The systems 100, 150, and 180 can be implemented on a variety of other IoT devices and systems.

In this example, the ECUs 156a-n are depicted as being communicatively connected to each other via a CANBus 182, which is a communication network within the vehicle 152. Messages between the ECUs 156a-n are broadcast over the CANBus 152 with sender and recipient information. If the messages are unencrypted, all of the ECUs 156a-n are able to read the contents of the messages. Furthermore, the only information identifying the sender and recipient is included in the message headers, which can be spoofed. Thus, without end-to-end communication security, the messages over the CANBus 152 are susceptible to eavesdropping and spoofing.

Using the custom end-to-end communication security layers 158a-n, each of the ECUs 156a-n is programmed to establish symmetric encryption keys for each of the ECU pairs. The symmetric keys and/or information that can be used to recreate the symmetric keys (e.g., public key of other controller) can be stored locally in communication tables 186a-n. For example, symmetric encryption keys can be used to encrypt communication between senders and recipients so that only the sender and recipient, which are the only two ECUs with access to the symmetric encryption key, are able to decode and read the information being transmitted. Additionally, these symmetric encryption keys also permit for the sender and recipients to validate the identity of the purported sender of a message as identified in the message header. For example, ECU A 156a and ECU B 156b establish a symmetric key for that ECU-pair (ECU A and ECU B) that is then only known to those ECUs. The other ECUs are not privy to this key, so they are not able to decode messages between ECU A and B, or to spoof the identity of either of those ECUs to infiltrate communication between that ECU-pair.

As described in greater detail below with regard to FIG. 4, the symmetric keys can be established between the ECUs 156a-n in any of a variety of ways, such as through public key cryptography, like Diffie-Helman or other techniques for two parties to create a shared secret through publicly distributed information. For example, each of the ECU 156a-n can create a public and private key pair, such as PubA and PrVA (188a) for ECU A 156a. The public keys can be shared with each of the other ECUs on the CANBus 182, and stored in each ECUs' communications table 186a-n. The private keys 188a-n are not shared with the other ECUs, and instead are kept private. Each ECU pair can then create a symmetric key (a shared secret) from a combination of the public keys stored in the communications table 186a-n and its private key 188a-n. For example, the ECU-pair of ECU A 186a and ECU B 186b can each independently create the symmetric key using each other's public key and the local private key. For instance, ECU A 186a can create the symmetric key from the PubB (stored in 186a) and PrVA (188a), and the ECU B 186b can create the same symmetric key from PubA (stored in 186b) and PrvB (188b). The private keys 188a-n may be temporarily created on the ECUs 156a-n from reliable and reproducible information on the ECUs 156a-n (e.g., PUFs) and used to generate symmetric keys, as needed (e.g., on boot of the ECUs), and may not be persistently stored by the ECUs 156a-n (e.g., deleted from memory after used to create symmetric keys, not stored in non-volatile memory). Similarly, the symmetric keys may not be persistently stored by the ECUs 156a-n either, and may be created on an as needed basis (e.g., to initiate a key stream) and subsequently deleted (e.g., deleted from memory, not stored in non-volatile memory). By persistently storing only partial information to create a symmetric key for the end-to-end communication in the communications table 186a-n and dynamically reproducing the other portion as needed, the ECUs 156a-n can further protect against potential malicious attacks that would attempt to retrieve private and/or symmetric keys from an ECU 156a-n. This can increase and improve the anti-spoofing security for each of the ECUs 156a-n and the CANBus 182 more generally.

The example communication tables 156a-n represent each of the entries as corresponding to an ECU (e.g., "ECU A," "ECU B"), but other options are also possible. For example, the communications table 156a-n can include entries for each CAN message ID and a corresponding public key for the other ECU(s) on the CANBus that either transmit or listen for that message. In another example, the communications table 156a-n can include entries for each ECU, with each entry including a field with the corresponding CAN message IDs that the other ECUs either transmit or listen to. In another example, the communications table 156a-n could be split across multiple tables that could each be secured and encrypted on the vehicle 152. For example, instead of possibly including multiple instances of each public key in the communications tables 156a-n (e.g., when storing entries based on message ID instead of ECU ID), another table can be used to store each unique public key that can be identified with an identifier that can be referenced from the communications table 156a-n. Other options are also possible.

Private information that is used to create and validate the private keys 188a-n and the symmetric keys (shared secret) can be something that is specific to the ECUs 156a-n that could not be cloned or otherwise identified by malware, such as through the use of PUFs. For example, the ECUs 156a-n can each include one or more PUFs (e.g., SRAM characteristics, processor crystal characteristics) that can be used to create and validate the symmetric keys so that, even if an ECU has been corrupted by malware, the malware will not be able to access, create, or validate the symmetric key to takeover communication with as part of an ECU pair. Furthermore, the communication tables 186a-n, which can store information used to create the symmetric keys, can be stored locally and encrypted on the ECUs 156a-n, which can additionally thwart any attempts by malware to exploit and use the communication tables 156a-n.

The remote computer system 164 (management computer system) can communicate remotely with the ECUs 156a-n to challenge and validate the operation of the ECUs 156a-n. The remote computer system 164 can include, for example, access to the keys for the ECU-pairs and/or images of the ECU firmware, and can use that information to challenge the ECUs 156a-n to validate themselves.

Figure 2:
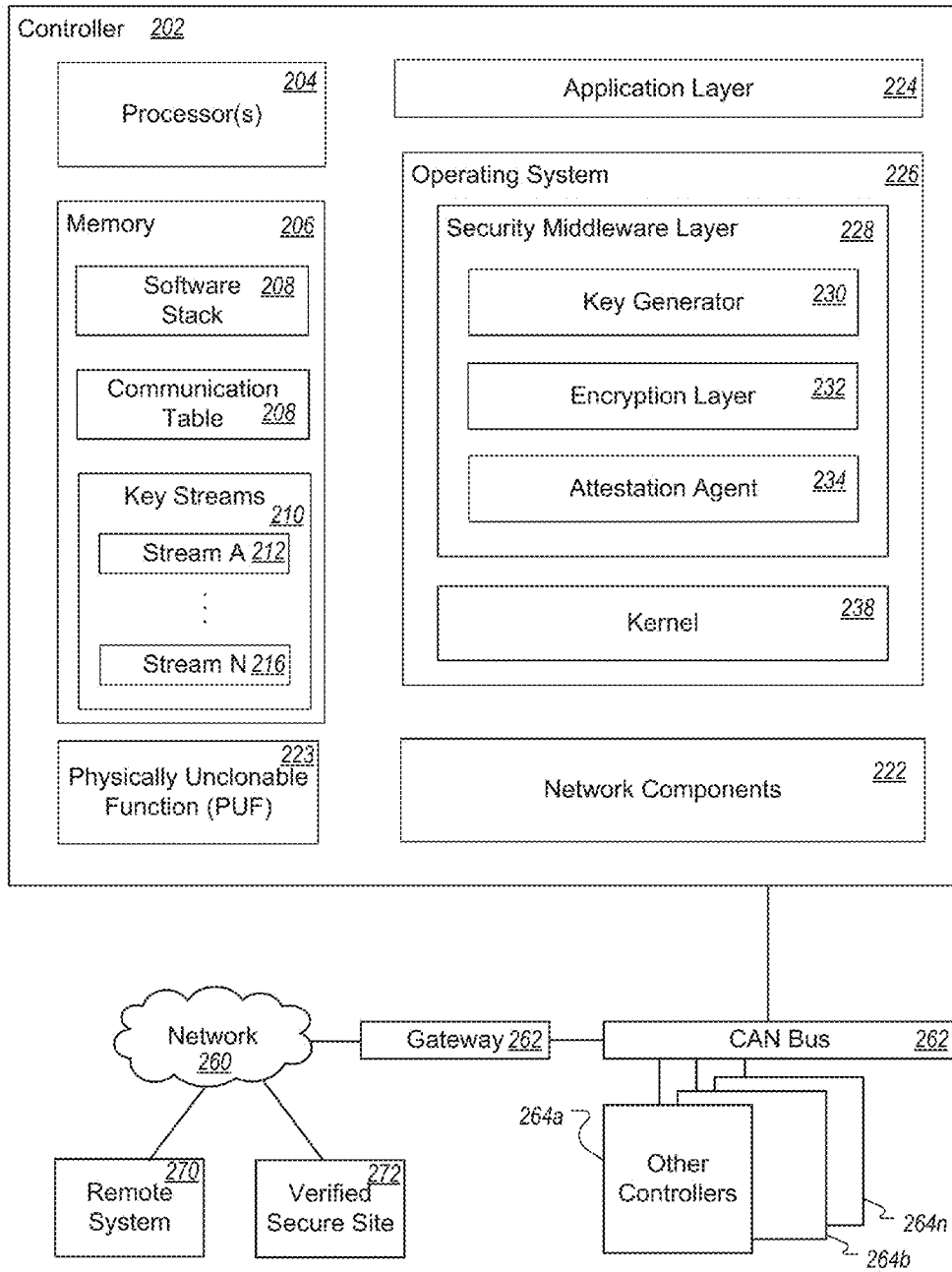
FIG. 2 is a diagram of an example system for providing end-to-end communication security on controllers.

FIG. 2 is a diagram of an example system 200 for providing end-to-end communication security on controllers. The example system 200 includes a controller 202 that can be similar to the controller 114 protected by security layer 106 and the ECUs 156a-n protected by security layers 158a-n described above with regard to FIGS. 1A-B. The system 200 also includes a CANBus 262 that connects the controller 202 to other controllers 264a-n, which are similar to the controller 202.

The controller 202 includes an application layer 224 at which one or more applications operate on the controller 202 through use of an operating system 226 for the controller 200. The operating system 204 includes a kernel 238 and the security middleware layer 228, which can implement end-to-end communication security for communication requests transmitted from the application layer 224 to the kernel 238, such as communication requests to the other controllers 264a-n.

The kernel 238 includes processes and functions that provide an interface for the operating system 226 to perform operations on the controller 202 using hardware, which includes one or more processors 204 (e.g., CPUs), memory 206 (e.g., volatile memory, non-volatile memory, RAM), and input/output (I/O) network components 222 (e.g., wired and wireless network cards/chip sets, network interface cards (MC)). The kernel 238 includes functions/process that direct operation of the hardware, such as program loading (e.g., functions and processes to load processes into a software stack 208 in memory 206 for execution by the processor(s) 204), in-memory services (e.g., functions that modify memory 206, functions to allocate information into and out of memory 206), networking services (e.g., processes to open network sockets and to transmit/receive network packets), and peripheral device processes (e.g., processes to interface with peripheral devices).

The security middleware layer 228 includes a key generator 230 that is programmed to generate symmetric keys with the other controllers 264a-n using public and private information. The key generation can be implemented using one or more PUFs 223 that are part of the controller 202. The keys can be generated when the controller 202 has received an indication that the controller 202 is operating within a known-safe environment, such as in a manufacturer or authorized servicer's facility. For instance, the key generator 230 can look for verification from the remote system 270 (e.g., management computer system 104, management computer system 164) that the controller 202 is within a secure environment before it is able to create keys with the other controllers 264a-n. The remote system 270 may rely on a verified secure site 272 to identify that the controller 202 (and/or a device/system within which the controller 202 is operating) is located within its facility, before issuing authorization to the key generator 230 to perform key generation operations.

The key generator 230 can store keys in a communication table 208 that is stored in memory 206 (stored in non-volatile memory). The communication table 208 can be similar to the communication tables 156a-n described above with regard to FIG. 1C. The communication table 208 can be stored with encryption.

Once the communication table 208 has been generated, an encryption layer 232 that is part of the security middleware layer 228 can use the communication table 208 during runtime to encrypt communication with the other controllers 264a-n. The encryption can be performed by the encryption layer 232 in ways that provide security with minimal performance impact on the controller 202. For example, the encryption layer 232 can provide a 1:1 encryption ratio that does not increase the size of the encrypted message being transmitted to the other controllers. The encryption layer 232 can also provide encryption without requiring any additional message headers or other fields that would additionally increase the message size and/or potentially alter the communication protocol. To increase security while using a static symmetric key, the encryption layer 232 can use output feedback (OFB) mode encryption (and/or other similar techniques) to vary the key that is used to encrypt each message in ways that are predictable to both the sender and receiver. As a result, the encryption layer 232 can use key streams 210 in memory 206 that are specific to communication with each of the other controllers 264a-n. For example, a first key stream A 212 can be specific to communication with other controller 264a and another key stream N 216 can be specific to communication with other controller 264n.

The security middleware layer 228 can additionally include an attestation agent 234 that is used to validate challenges from the remote system 270. The attestation agent 234 can perform operations on various aspects of the controller 202 to verify its authenticity, such as providing hashes of the operating system 226, the communication table 208, PUFs 223, and/or other features that can validate to the remote system 270 that the controller 202 has not been corrupted by malware.

The controller 202, the CANBus 262, and the other controllers 264a-n can be part of a common device and/or system, such as the vehicle 152. The CANBus 262 can be connected to a gateway 262 that provides access to one or more networks 260 (e.g., internet, WAN, LAN, wireless network, mobile data network, cellular network, combinations thereof) outside of such a common device and/or system. An example of such a gateway 262 is identified as 184 in FIG. 1C.

Figure 3:
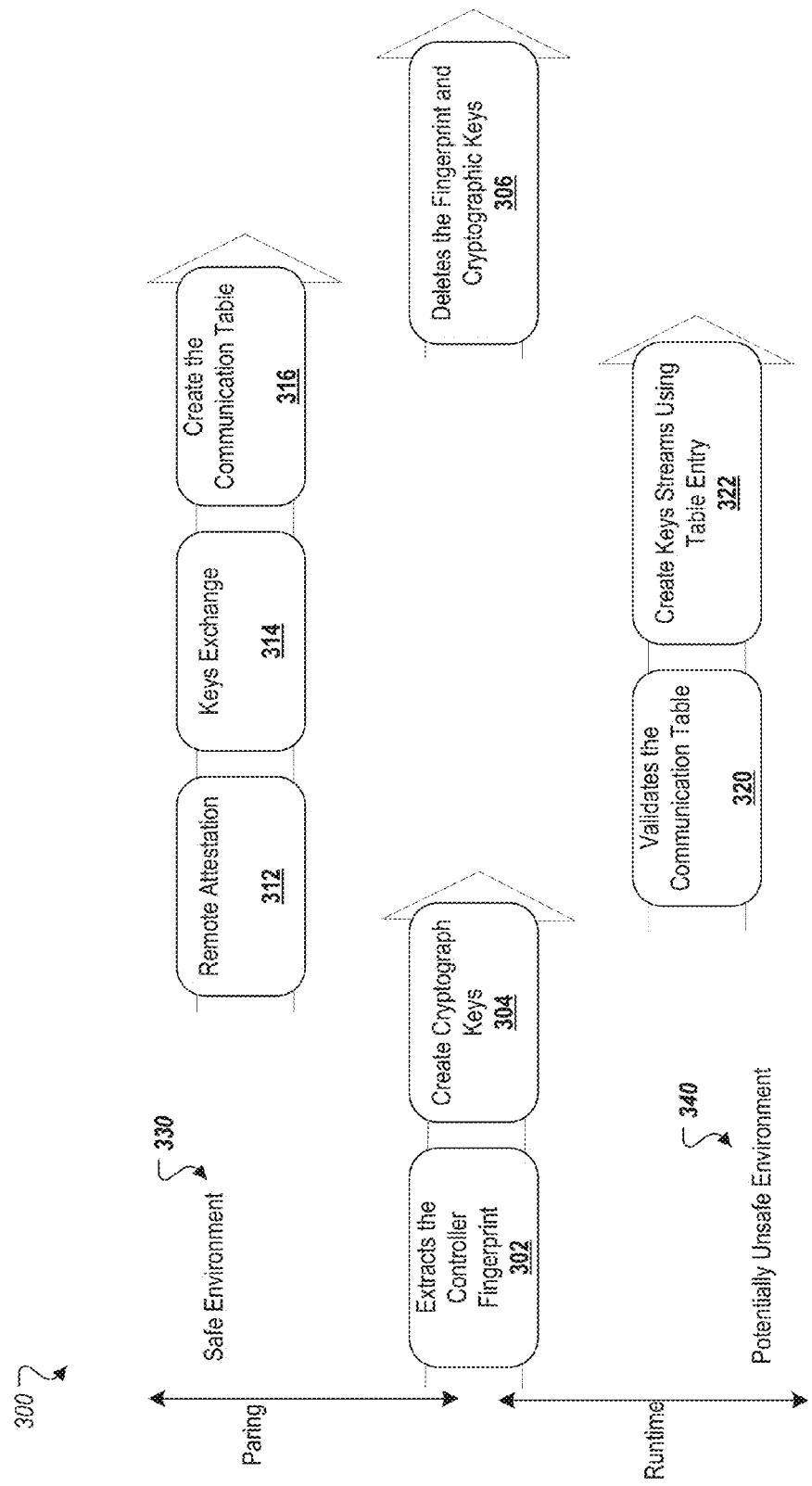
FIG. 3 is a flowchart of an example technique for providing end-to-end communication security on a controller.

FIG. 3 is a flowchart of an example technique 300 for providing end-to-end communication security on a controller. The example technique 300 can be performed by any of variety of controllers, such as the controllers 114, the ECUs 156a-n, the controller 202, the controllers 264a-n, and/or other controllers.

The example technique 300 has two different branches depending on whether the controller is located within a safe environment 330 or a potentially unsafe environment 340. The safe environment 330 can be required to perform a pairing portion of the technique 300 in which pairs of controllers create keys that are specific to the controller-pair, and which are subsequently used in the potentially unsafe environment 340 during runtime to encrypt communication between the controller-pair. The safe environment 330 can be, for example, a manufacturer's facility, a verified service facility, and/or other verified locations. The safe environment 330 can be verified by the controller in any of a variety of ways, such as by a user entering a code that the controller can then verify with a remote system (e.g., management computer system 104, management computer system 164), a facility providing a request to the remote system with the controller's identifier (or an identifier for a broader system/device that includes the controller) and the controller then verifying its presence through communication with the remote system, the remote system providing authorization to the controller, and/or other techniques. The potentially unsafe environment 340 is what the controller will typically encounter during runtime, which is the controller operating outside of a secured and verified facility in an environment that is uncontrolled and potentially vulnerable to attack on the controller. The safe environment 330 branch of the technique 300 can be performed, for example, as part of a one-time event during the first system boot, and the unsafe environment branch 340 can be performed as part of every system boot.

Both branches of the technique 300—the safe environment 330 and the potentially unsafe environment 340—involve the controller extracting a fingerprint (302) and creating cryptographic keys (304). The fingerprint is something that is unique to the controller and that is reproducible, and can be extracted in any of a variety of ways. For example, the fingerprint can be generated from one or more PUFs on the controller, so extracting the fingerprint can involved determining the one or more PUFs. Depending on the type of PUF that is being used by the controller to generate the fingerprint, extraction can involve reading values from volatile memory, non-volatile memory, processor characteristics (e.g., crystal vibration or frequency), and/or performing one or more operations on those extracted values (e.g., hash of those values, combining multiple PUF values). How the fingerprint is determined can be encoded, for example, in the custom end-to-end communication security layer that is created for the controller (e.g., included as part of the custom layer 108).

Cryptographic keys can be created (304) by the controller. Referring to FIG. 4, which depicts an example technique 400 for creating a symmetric key stream between two example controllers 402-404, each controller that is part of a controller-pair (controller A 402 and controller B 404) can extract a fingerprint (410, 420), such as from one or more PUFs. The controllers 402-404 can create cryptographic keys (412, 422) from the fingerprints (410, 420). The cryptographic keys that are created can each include a private key (414, 424) that is kept secret by the respective controllers 402-404, and a public key (415, 425) that is exchanged between the controllers 402-404. For example, the controller A 402 provides its public key 415 to the controller B 404, and the controller B 404 provides its public key 425 to the controller A 402. The private keys (414, 424) and exchanged public keys (415, 425) can then be used by both controllers 402-404 to generate a symmetric key for the controller-pair. Each of the controllers 402-404 can perform the same key creation processes (416, 426) for generating the symmetric key, but can use different inputs. Any of a variety of appropriate techniques can be used for this, such as Elliptic-curve Diffie-Hellman (ECDH) over the secp256r1 curve, and/or other appropriate techniques. In the end, both of the controllers 402-404 can generate the same shared secret (symmetric key 417, 427) without that shared secret having ever been broadcast or made public. The symmetric key stored on both controllers 402-404 (417, 427) can then be used to create symmetric key streams 419, 429 that can be used to encrypt messages between the controllers 402, 404 (418, 428). Any of a variety of appropriate techniques can be used to generate the key streams 419, 429 from the symmetric keys 417, 427, such as AES256-OFB mode and/or other appropriate techniques.

Figure 4:
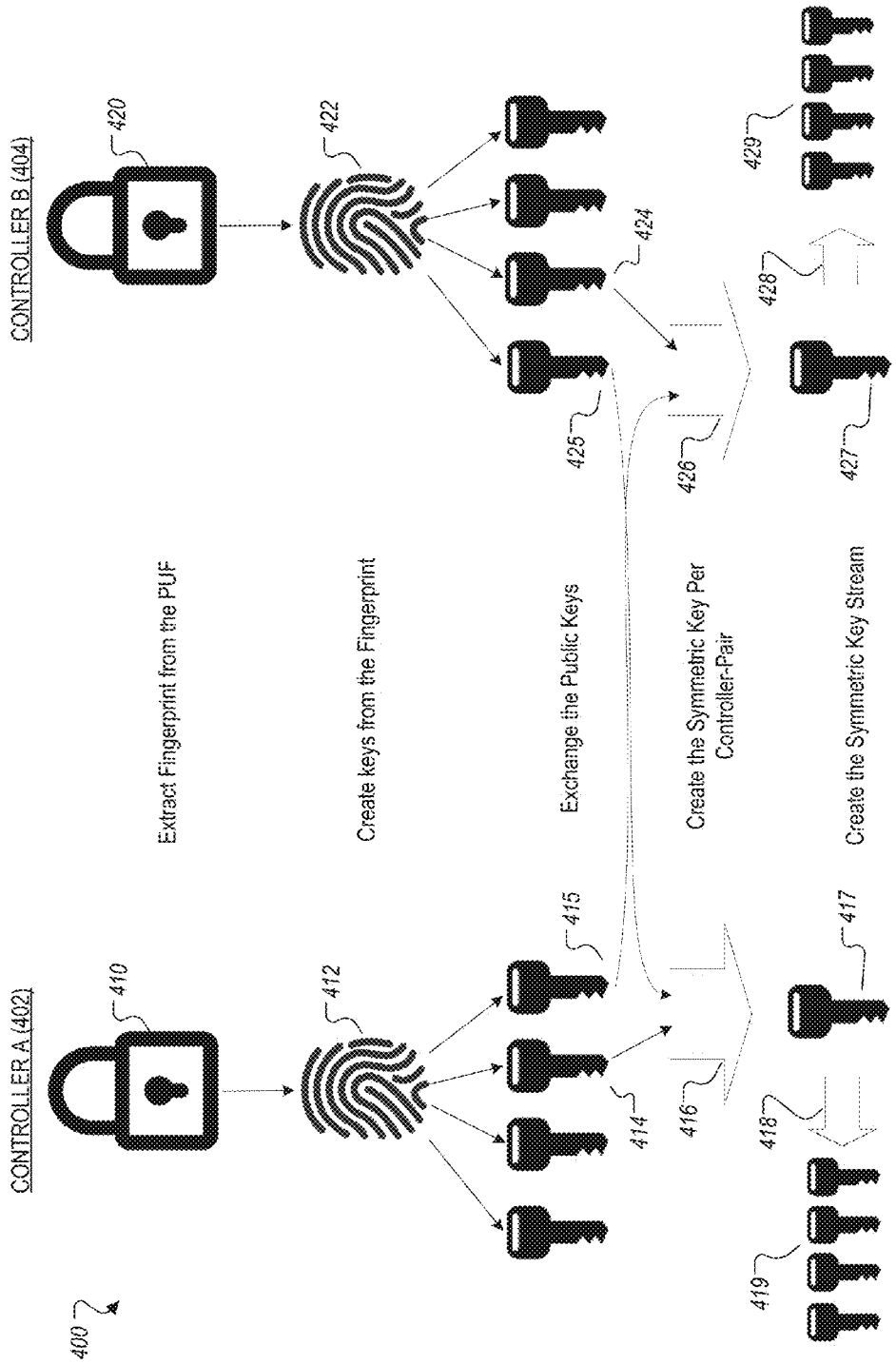
FIG. 4 depicts an example technique for creating a symmetric key stream between two example controllers.
Figure 5:
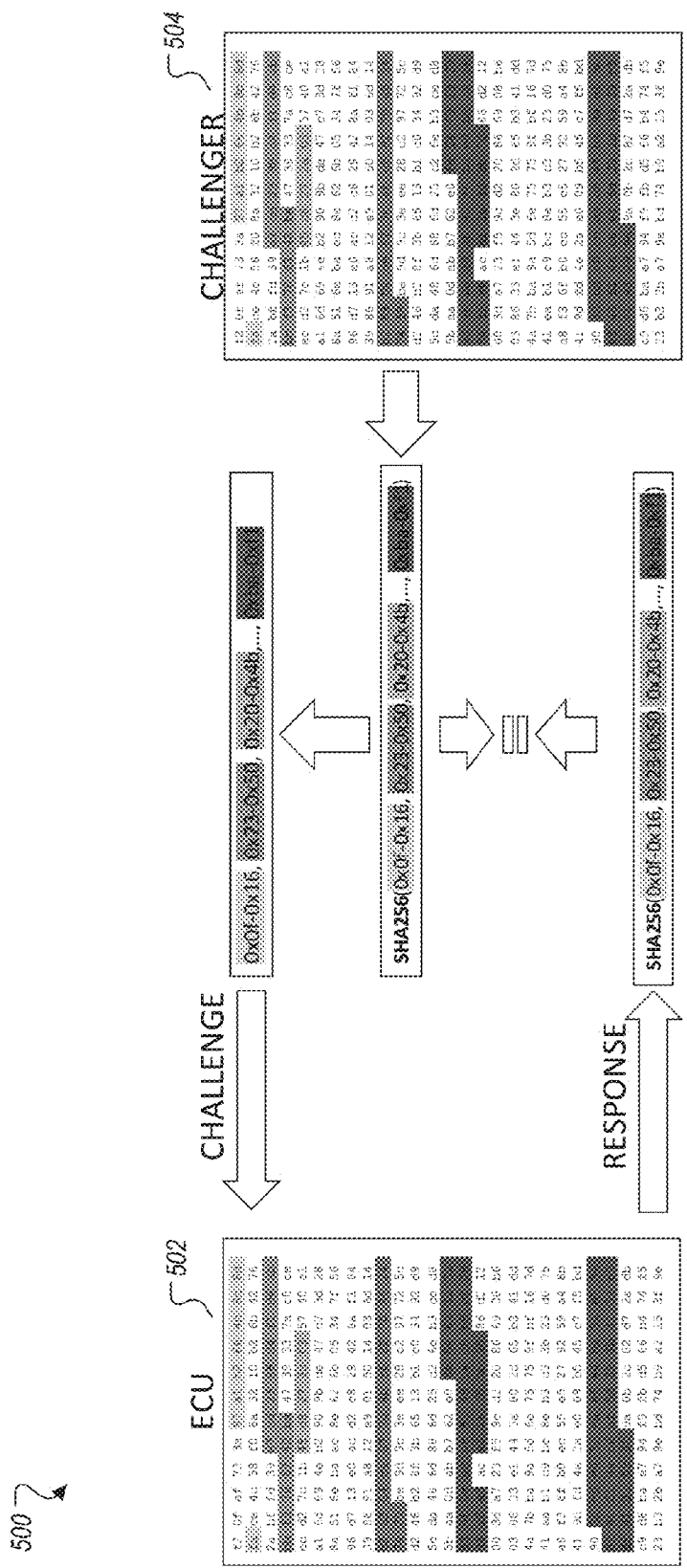
FIG. 5 depicts an example remote challenge and response process between a controller and a remote system.

Referring back to FIG. 3, the key creation referenced in step 304 can correspond to the creation of keys (414, 415) from the fingerprint (412) in FIG. 4. In the safe environment 330, the controller can undergo remote attestation (312) before subsequently exchanging the keys with the other controllers (314) and creating the communications table (316). As described above, remote attestation can include a remote system validating the identity of the controller through a challenge and response process. For example, the remote system can include an image of the controller's firmware, information on one or more PUFs of the controller, keys that the controller and/or remote system has generated (e.g., public keys, private keys), and/or other information, whether alone or in combination, that can be used to verify the controller's identity. Referring to FIG. 5, which depicts an example remote challenge and response process 500 between a controller 502 and a remote system 504, the remote system 504 can have an image of the controller 502 firmware. The remote system 504 can request that the controller 502 send the hash of several random segments in the firmware in order to prove that its firmware is untampered. The controller 502 can retrieve the sections of the firmware, perform the hash, and transmit the hashed version of the firmware portions back to the remote system 504, which can perform the same process on its image of the firmware. So long as all of the hashes match, the remote system 504 can validate the controller and authorize it to proceed with the technique 300.

Referring back to FIG. 3, once the controller passes the remote attestation (312), the controller can proceed to exchange keys with each of the other controllers (314). This can include the public key exchange described above with regard to public keys 415 and 425.

Once exchanged, the controller can generate a symmetric key for each controller-pair using the public keys that have been exchanged and the private keys that have been kept secret (e.g., 416 and 426), and can use the symmetric key values to create a communications table (316). Symmetric keys can be generated for each controller-pair, and/or they can be generated for each leg (sending and receiving) of communication between each controller-pair. For example, during the pairing session, every controller can create and send IDs for both the listening and transmitting operations that are part of each controller-pair encryption tunnel. The controller can transmit these IDs along with its public key for each tunnel to the corresponding controller that is on the other end of each tunnel. Each ECU can build its own communication table with the collected information. In some instances, the communication table will only include the IDs and the public keys of the other controllers, which can then be used with the cryptographic keys that are generated (304) to recreate the symmetric keys. In those instances, the communication table is not actually storing the symmetric keys, as an additional layer of security. In other instances, the symmetric keys that are generated from the received information can additionally and/or alternatively be stored in the communications table along with the IDs transmitted with messages to permit quick key retrieval and encryption/decryption during runtime. Table 1, reproduced below, is a simplified example of a communications table that can be generated:

public key $P_{k3}$ for the other ECU. The third entry is one in which no encryption is being used for transmitting the message 0x69, as indicated by the absence of a public key. This can arise in a variety of scenarios, such as when the ECU on the other end of the communication does not have a security layer to provide end-to-end communication, the communication is intentionally left open/public, there are multiple ECUs sending/receiving the message, and/or others. The fourth entry is one in which there are multiple ECUs sending/receiving the message 0x61, as indicated by the presence of multiple public keys. In some instances, the presence of multiple recipients/senders can cause the communication to be unencrypted. In other instances, the presence of multiple recipients/senders can cause the ECU to use multi-way public key encryption through which multiple public keys and a private key are used to generate a shared secret among multiple different ECU. In other instances, the presence of multiple recipients/senders can cause the ECU to broadcast the message multiple times, which each broadcast being encrypted for a different recipient. Other options are also possible.

Although not depicted above in the example in Table 1, communications tables can additionally include other information related to messages and/or other entities that are sending/receiving messages. For example, the communications table can include a field that identifies the format of each message that is being transmitted. The message format information can be used to verify that a message has been properly decrypted, for example (e.g., ensure that each of the

TABLE 1

| Arbitration ID | Public key. | Operation | Controller Performance |
|---|---|---|---|
| 0x23 | $P_{k1}$ | Listen | Paired with transmitter, will be decrypted |
| 0x57 | $P_{k3}$ | Transmit | Paired with listener, will be encwpted |
| 0x69 | | Transmit | Got no answer, no encryption |
| 0x61 | $P_{k5}, P_{k6}$ | Transmit | More than one listener, broadcast, no encryption |

Although the entries depicted in the example communications tables 186a-n in FIG. 1C are identified by the ECU identifier, the communications table can additionally and/or alternatively have each entry in the communications table identified by an arbitration/message identifier, as shown in Table 1. This arbitration/message identifier can be an identifier for each type of message that is transmitted across the CANBus. An ECU will create a communications table with entries and corresponding identifiers for the messages that the ECU will either transmit or listen for over the CANBus. Other message identifiers that are not included in the communications table can be ignored by the ECU.

For each arbitration/message identifier, the communications table can specify the public key for the other ECU(s) that are on the other end of the communication. A couple different example scenarios for the entries in a communication table are depicted in Table 1. The first entry (arbitration ID 0x23) includes one in which the other ECU is listening for messages with ID 0x23. The public key for the other ECU transmitting this message is $P_{k1}$, which indicates that the other ECU will be transmitting messages using encryption, which can be decrypted by the ECU using a symmetric key created from the ECU's private key and the other ECU's public key $P_{k1}$. The second entry is similar to the first entry, but in this instance the ECU is transmitting the message 0x57 instead of listening, and will be using a different symmetric key based on the ECU's private key and the fields in the decrypted message correspond to the expected fields for that message format).

Additionally, as made clear in Table 1, messages transmitted and received can be either encrypted or unencrypted based on whether there is a corresponding security layer and public key on another ECU. Decisions on whether an ECU will participate in CANBus encryption can be made, for example, by OEMs making/selling the ECUs. However, an ECU that has a security layer can concurrently transmit and receive both encrypted and unencrypted messages depending on the availability of encryption with other ECUs on the other end of those communications.

Once the communications table has been created, it can be securely stored on the controller. For example, the communications table can be signed using a hash-based message authentication code (HMAC) and encrypted using a key ($K_{sym}$) to symmetrically encrypt the communications table. Like the public and private keys used to generate the communications table, the key used to encrypt the communications table ($K_{sym}$) can be one of the keys that is generated from the fingerprint for the controller (step 304). In some instances, another key ($K_{MAC}$) that is a MAC secret can also be used to authenticate the communication table. The communications table can then be saved locally on the controller's non-volatile memory for future use. In some instances, the communications table may be designated as read-only in storage, so as to prevent malware from corrupting, deleting, or modifying the communications table in any way. As indicated above, the symmetric key can be generated using any of a variety of techniques, such as Diffie-Helman and/or others, and the communication stable can be signed using any of a variety of techniques, such as HMAC.

Once the communication table has been generated and securely stored on the controller (316), the controller deletes the fingerprint and cryptographic keys that were generated to create the table (306). For example, those values may have been stored in volatile memory and/or non-volatile memory. Once the communications table has been generated, those areas of memory can be over-written and returned to the memory heap as free.

In the potentially unsafe environment 340, the steps 302 and 304 are both performed, but instead of going through the attestation and communications table creation process (312-316), the controller can instead validate the communications table (320) and use it to create key streams (322) that can be used to provide end-to-end communication security with the other controllers. For example, after the controller creates its keys (304), it uses $K_{sym}$ (one of the keys that are created from steps 302-304) to decrypt the table, and $K_{mac}$ (another one of the keys created from steps 302-304) to verify that the table is untampered. Using the table and the private cryptographic keys ($K_{pri}$) generated at step 304, the controller can use one or more key creation techniques (e.g., ECDH) to create symmetric keys for every ID on the table (322). For example, using the $K_{pri}$ from step 304 and the $K_{pub}$ from each entry in the communications table, the controller can generate the symmetric keys for communicating with the other controllers. For instance, once the controller has its symmetric keys, it can encrypt and decrypt every message sent with these IDS. The steps 302-304 and 320-322 can occur, for example, every time the controller boots up and can also occur without a single message being transmitted by the controller to the other controllers over the CANBus. Creating the symmetric key streams (322) without having to communicate with the other controllers can provide a variety of advantages, such as minimizing traffic over the CANBus and not permitting a corrupted controller to potentially influence the values stored in the communications table and, thus, undermine the end-to-end communications security.

The controller can perform the safe environment process 330 to create the communications table on its initial boot and at subsequent times when authorized at a verified site, such as during replacement or repair of one or more controllers.

In instances where the controller detects invalid values during the runtime environment 340, it can transmit alerts back to the remote system and, in some instances, provide an alert to the user (e.g., dash board warning light, transmit message to mobile device) indicating that one or more system controllers has potentially been corrupted, and that service is required. For example, if the controller is not able to decrypt or authenticate the communications table, it can generate such an alert. In another example, if the controller uses a symmetric key to issue a challenge and response from the other controller at the other end of the communication tunnel (e.g., provide hash of public key value, provide hash of symmetric key, provide hash of key stream value), and that other controller is not able to respond with the correct value, then an alert can be generated that the other controller has been corrupted and/or is being spoofed. In another example, if the controller receives a message from another controller that it is unable to effectively decrypt with the key stream for that communication tunnel (e.g., decrypted value does not fall within range of possible values, such as permissible range of values within field, message or data structure does not fit within expected message or data structure), then the controller can provide an alert that another controller is potentially spoofing the identity of the sender or that the sender has been potentially corrupted.

Figure 6:
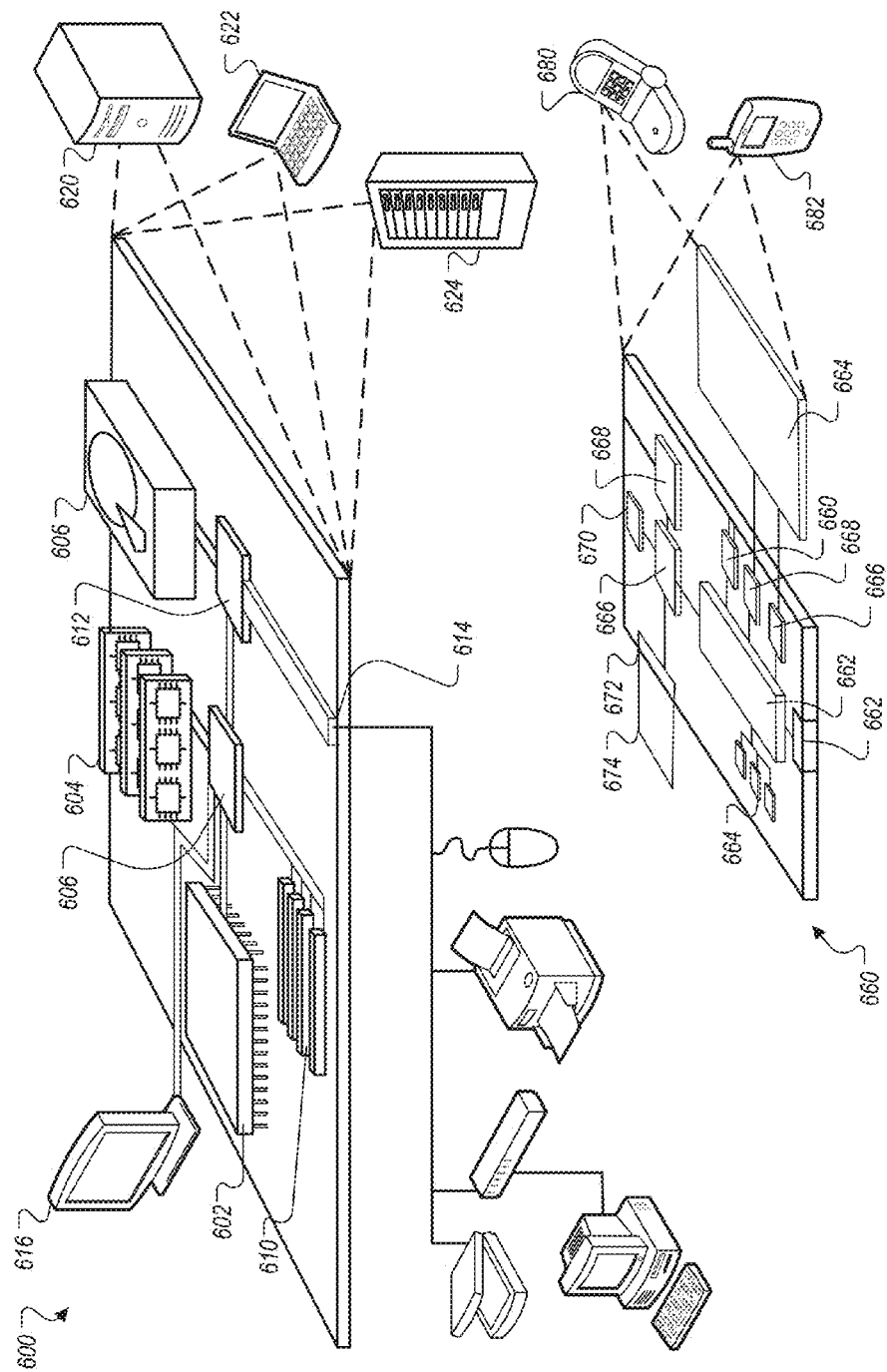
FIG. 6 is a block diagram of example computing devices.

FIG. 6 is a block diagram of example computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 600 is further intended to represent any other typically non-mobile devices, such as televisions or other electronic devices with one or more processers embedded therein or attached thereto. Computing device 650 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 600 includes a processor 602, memory 604, a storage device 606, a high-speed controller 608 connecting to memory 604 and high-speed expansion ports 610, and a low-speed controller 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed controller 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of duties is an example only.

In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed bus 614. The low-speed bus 614 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as computing device 650. Each of such devices may contain one or more of computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The computing device 650 may also be provided with a storage device, such as a micro-drive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the computing device 650, such as control of user interfaces, applications run by computing device 650, and wireless communication by computing device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of computing device 650 with other devices. External interface 662 may provide, for example, for wired communication (e.g., via a docking procedure) or for wireless communication (e.g., via Bluetooth® or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to computing device 650 through expansion interface 672, which may include, for example, a subscriber identification module (SIM) card interface. Such expansion memory 674 may provide extra storage space for computing device 650, or may also store applications or other information for computing device 650. Specifically, expansion memory 674 may include instructions to carry out or supplement the processes described above, and may include secure information also. Thus, for example, expansion memory 674 may be provide as a security module for computing device 650, and may be programmed with instructions that permit secure use of computing device 650. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Computing device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 668 (e.g., a radio-frequency transceiver). In addition, short-range communication may occur, such as using a Bluetooth®, WiFi, or other such transceiver (not shown). In addition, GPS receiver module 670 may provide additional wireless data to computing device 650, which may be used as appropriate by applications running on computing device 650.

Computing device 650 may also communicate audibly using audio codec 660, which may receive spoken information from a user and convert it to usable digital information. Audio codec 660 may likewise generate audible sound for a user, such as through a speaker, e.g., in a handset of computing device 650. Such sound may include sound from voice telephone calls, may include recorded sound (e.g., voice messages, music files, etc.) and may also include sound generated by applications operating on computing device 650.

The computing device 650 may be implemented in a number of different forms, as shown in the figure. For example, it may be implemented as a cellular telephone 680. It may also be implemented as part of a smartphone 682, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for providing end-to-end communication security for a controller area network (CANbus) in an automotive vehicle across which a plurality of electronic control units (ECU) communicate, the method comprising:
   determining, by a first ECU in the automotive vehicle, a fingerprint for the first ECU;
   generating, by the first ECU, a plurality of cryptographic keys using the fingerprint as a seed value, the plurality of cryptographic keys including, at least, a public key and a corresponding private key for the first ECU and a communications table key for the first ECU;
   performing a remote attestation process with a remote computer system to validate the first ECU;
   in response to passing the remote attestation process, exchanging public cryptographic keys by the first ECU locally over the CANbus with other ECUs from among the plurality of ECUs in the automotive vehicle, wherein the CANbus in the automotive vehicle has a plurality of CANbus messages with corresponding CANbus message identifiers, wherein the first ECU exchanges public cryptographic keys with the other ECUs for each of the CANbus message identifiers for which the first ECU is programmed to either transmit or listen for corresponding CANbus messages on the CANbus, wherein the first ECU is programmed to generate a plurality of symmetric keys to use for communicating using the CANbus message identifiers for communication with the other ECUs using the private key for the first ECU and the public keys received from the other ECUs;
   creating, by the first ECU, a communication table that includes entries for the plurality of CANbus messages, the entries in the communication table including the corresponding CANbus message identifiers and the public keys received from the other ECUs;
   encrypting, by the first ECU, the communication table using the communications table key; and
   storing, by the first ECU, the encrypted communication table locally on the first ECU.

2. The method of claim 1, the method further comprising:
   receiving, at the first ECU, an indication that the first ECU is currently operating within a safe environment;
   wherein the remote attestation, the public cryptograph key exchange, and the communication table creation, encryption, and storage are performed in response to receiving the indication that the first ECU is operating within a safe environment.

3. The method of claim 1, the method further comprising:
deleting, by the first ECU, the plurality of cryptographic keys and the fingerprint after storing the encrypted communication table.

4. The method of claim 3, the method further comprising:
during runtime and after deleting the plurality of cryptographic keys and the fingerprint, performing the following:
determining, independent of the first fingerprint determination, the fingerprint for the first ECU;
generating, independent of the first generation of the plurality of cryptographic keys, the plurality of cryptographic keys using the fingerprint as the seed value;
decrypting the encrypted communication table using the communications table key from the plurality of cryptographic keys;
generating the plurality of symmetric keys for each of the entries in the communication table using the private key for the first ECU and the public keys stored in the communication table;
creating a plurality of symmetric key streams for communicating with each of the plurality of other ECUs using the plurality of symmetric keys; and
securely transmitting and listening for encrypted CANbus messages over the CANbus with symmetric encryption using the plurality of symmetric key streams.

5. The method of claim 4, wherein:
the plurality of cryptographic keys further include an authentication key,
the encrypted communication table is signed using the authentication key, and
decrypting the encrypted communication table includes authenticating the communication table using the authentication key.

6. The method of claim 5, wherein the encrypted communication table is signed using a hash-based message authentication code (HMAC) generated with the authentication key and the encrypted communication table.

7. The method of claim 4, wherein the plurality of symmetric keys are generated using Diffie-Helman.

8. The method of claim 4, further comprising:
deleting, by the first ECU, the plurality of cryptographic keys and the fingerprint after generating the plurality of symmetric keys.

9. The method of claim 1, wherein the fingerprint is determined from one or more physically unclonable functions (PUFs) on the first ECU, wherein values for the one or more PUFs for the first ECU are independent of and different from values for PUFs on the other ECUs in the automotive vehicle.

10. The method of claim 9, wherein at least one of the one or more PUFs is determined based on RAM or SRAM characteristics of the first ECU.

11. The method of claim 9, wherein at least one of the one or more PUFs is determined based processor crystal characteristics of the first ECU.

12. The method of claim 4, further comprising:
detecting, by the first ECU, one or more communication-related errors on the first ECU; and
transmitting, by the first ECU, an alert to the remote computer system.

13. The method of claim 12, wherein the one or more communication-related errors include the communication table being unsuccessfully decrypted or authenticated by the first ECU.

14. The method of claim 12, wherein the one or more communication-related errors include an encrypted CANbus message from at least one of the other ECUs being unsuccessfully decrypted using a corresponding symmetric key for the corresponding CANbus message identifier, and
the method further comprising:
in response detecting the one or more communication-related errors, dropping the message by the first ECU.

15. The method of claim 14, wherein unsuccessful decryption of an encrypted message includes one or more of: a message structure being incorrect, a message field being incorrect, and a data structure in the message being incorrect.

16. The method of claim 15, wherein the entries in the communication table include message formats for the plurality of CANbus messages, wherein the message formats are used to determine whether the message structure is incorrect, the message field is incorrect, and the data structure of the message is incorrect.

17. The method of claim 1, wherein the remote attestation process comprises:
receiving, at the first ECU, a challenge request with regard to one or more segments of the first ECU's firmware;
generating, by the first ECU, hash values of the one or more segments; and
transmitting, by the first ECU, the hash values to the remote computer system.

18. The method of claim 1, wherein the entries in the communication table include the corresponding CANbus message identifiers and the public keys received from the other ECUs, and do not include the symmetric keys.

19. The method of claim 1, the method further comprising:
determining, by the first ECU, that the first ECU is currently operating within a safe environment;
wherein the remote attestation, the public cryptograph key exchange, and the communication table creation, encryption, and storage are performed in response to receiving the indication that the first ECU is operating within a safe environment.

20. The method of claim 19, wherein the determination that the first ECU is currently operating within a safe environment is based on the first ECU being booted-up for the first time.

* * * * *